June 26, 1962 D. L. BAILEY 3,041,542

BROAD-BAND DISCRIMINATOR SYSTEM

Filed March 12, 1959

INVENTOR.
DAVID L. BAILEY
BY Wade Koontz and George Fine
ATTORNEYS

United States Patent Office 3,041,542
Patented June 26, 1962

3,041,542
BROAD-BAND DISCRIMINATOR SYSTEM

David L. Bailey, Arlington, Mass., assignor to the United States of America as represented by the Secretary of the Air Force Filed Mar. 12, 1959, Ser. No. 799,055
1 Claim. (Cl. 329—116)

The present invention relates to a microwave discriminator system and more particularly to a highly stable discriminator system which provides broad-band operation and may be utilized as a sensing device for automatic frequency control.

Discriminators may be utilized to control the frequency of a reflex klystron. The outputs of two detectors are balanced against each other, and the difference is applied to a D.C. amplifier. The output is applied to the repeller electrode of the klystron. In this way a very small unbalanced output between the detectors will produce sufficient change in repeller voltage to make a large correction in the frequency generated by the klystron.

The present invention provides a microwave broad-band discriminator which extends the "lock-in" range when utilized as a sensing device for automatic frequency control. It is comprised of two discriminators cascaded. One of these has a discriminator characteristic which has a rapid rate of change of voltage as a function of frequency at the center frequency and therefore, drops rapidly to zero as the frequency increases or decreases from the center frequency, the second has a very small slope at the center frequency, in the same direction as the first, but continues to increase in one direction and decrease in the other for all frequencies at which the automatic frequency control system must operate. The resultant output of these two discriminators goes through the center frequency with a large slope, giving high stability at the center frequency, but permits positive error sensing even at frequencies far removed from the center frequency.

This system eliminates the possibility of false crossovers occurring when non-ideal components such as an unbalanced hybrid junction or crystal are used in the discriminator. This invention makes unnecessary previously used extensive additional circuitry for a sweeping arrangement to search for the center frequency necessary for wide-band operation of automatic frequency control systems.

An object of the present invention is to provide a novel discriminator system which is highly stable.

Another object of the present invention is to provide a novel discriminator system which has broad-band characteristics.

A further object of the present invention is to provide a novel discriminator system which is highly stable at the center frequency, but permits positive error sensing even at frequencies far removed from the center frequency.

The various objects and the features of novelty which characterize the present invention will appear more fully from the following detailed description when read in conjunction with the attached drawings showing preferred embodiments.

Figure 1:
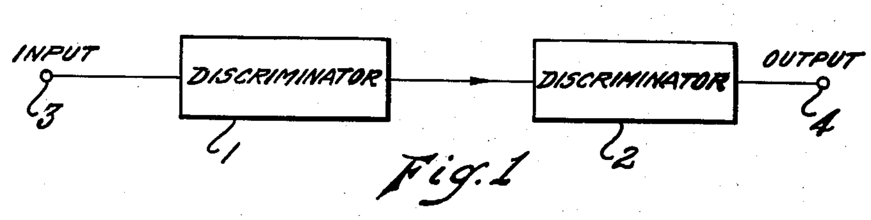
FIG. 1 shows a block diagram of two discriminators cascaded.
Figure 2:
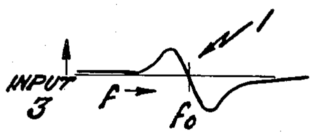
FIG. 2 shows the characteristic curve for discriminator 1 of FIG. 1.
Figure 3:
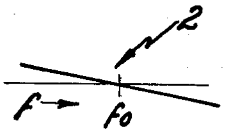
FIG. 3 shows the characteristic curve for discriminator 2 of FIG. 1.

FIG. 1 shows a block diagram of two discriminators. Terminal 3 is adapted to receive an input signal with center frequency, $f_0$. This signal is then fed to discriminator 1. Discriminator 1 is so designed as to produce a characteristic as shown in the curve of FIG. 2. This characteristic as indicated has a rapid rate of change of voltage as a function of frequency at the center frequency, $f_0$, and, therefore, drops rapidly to zero as the frequency increases or decreases from $f_0$. The output from discriminator 1 is fed to discriminator 2. Discriminator 2 is so designed that it has a characteristic as shown in the curve of FIG. 3. This characteristic has a very small slope at the center frequency, in the same direction as the first, but continues to increase in one direction and decrease in the other.

Figure 4:
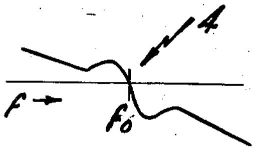
FIG. 4 shows the resultant curve of the cascaded discriminators of FIG. 1.

The resultant characteristic of discriminators 1 and 2 is shown as a curve in FIG. 4. The resultant output at terminal 4 of these two discriminators goes through the center frequency with a large slope, giving high stability at the center frequency, but permits positive error sensing even at frequencies far removed from $f_0$.

Figure 5:
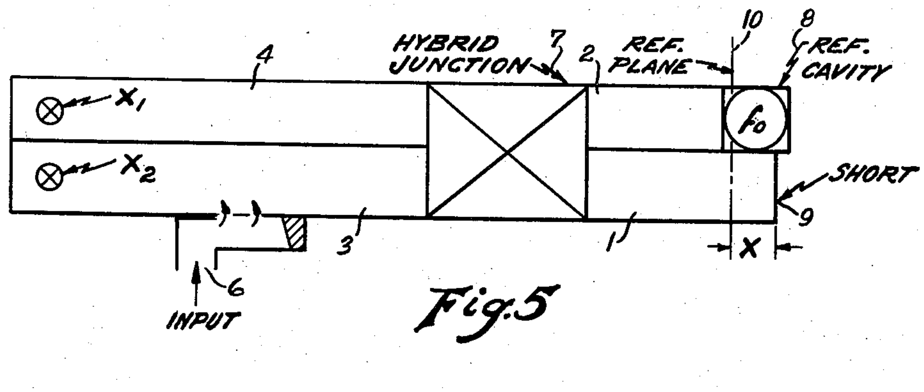
FIG. 5 shows a D.C. discriminator.

FIG. 5 illustrates a preferred embodiment of the invention utilizing a D.C. discriminator whose electrical behavior is similar to that shown and described in FIGURE 2.30 of page 63 and on pages 63–67 of Radiation Laboratory Series, Volume 11, published by McGraw-Hill Book, Co. Inc. in 1947. This discriminator has a characteristic similar to that shown in FIG. 2. $X_1$ and $X_2$ shown in FIGURE 5 represent detectors. $X_1$ being in the number 4 arm, and $X_2$ in the number 3 arm. The input signal is applied to the number 3 arm by way of input waveguide 6. Arms 3 and 4 are parallel and adjacent to each other and are interconnected to hybrid junction 7. Reference cavity 8 is connected in arm 2 and short 9 is provided for arm 1. Arms 1 and 2 are parallel and adjacent to each other and are also interconnected to hybrid junction 7. The input signal is received by arm 3 and is fed to hybrid junction 7. The signal is then fed equally to arms 1 and 2. Cavity 8 and short 9 reflect the signals in their respective arms 2 and 1. The reflected signals are received by hybrid junction 7 and from there they are transmitted to detectors $X_2$ and $X_1$ by way of arms 3 and 4, respectively. The output signal is taken from detectors $X_1$ and $X_2$ and is equal to $X_1$—$X_2$. Reference plane 10 is the electrical plane in cavity 8 which appears as a short as to the center frequency, $f_0$, and frequencies for off $f_0$. It is to be noted that aforesaid hybrid junction 7 is of the conventional type in its mode of operation and is such as described on pages 825–834 of Principles of Radar by Reintjes and Coate, 3rd Edition, published in 1952 by McGraw-Hill Book Co., Inc. Hybrid junction 7 thus divides the signal input received by way of arm 4 equally into arms 1 and 2. In addition thereto, hybrid junction 7 divides aforesaid reflected signals from cavity 8 and short 9 equally into arms 3 and 4. The reflected signals present in arm 4 are then, of course, a vector sum which is received by detector $X_1$, and provide a curve as shown in FIGURE 2 as the frequency of the input signals goes through zero. The reflected signals in arm 3 are also a vector sum which is received by detector $X_2$ and provide a curve as shown in FIGURE 3 as the frequency of the input signal goes through zero. The output signal of the discriminator system is taken by combining the outputs of detectors $X_1$ and $X_2$ which then provides a curve as shown in FIGURE 4 as the frequency of the input signal goes through zero. The distance "x" is an odd integral number multiple of one wavelength, the multiple being of any odd number value between 1 and 7. When the cavity of FIG. 5 is replaced by a short, the discriminator exhibits characteristics similar to that shown in FIG. 3. The distance to the right of reference plane 10 is hereinafter referred to as "$x$" positive and to the left thereof as "$x$" negative. By placing the short at the "$x$" positive position a preselected odd number of eighth wavelengths a curve as shown in FIGURE 3 is contributed thereby, whereas a curve as shown in FIGURE 2 is contributed by the combination of cavity 8 and short 9. The aforementioned two curves then providing a series effect as shown in FIGURE 4. For "$x$" negative, the slopes of the two curves are in opposition at $f_0$, while with "$x$" positive, the slopes are aiding. As the cavity behaves like a short when far from $f_0$, the effect described for the circuit in FIG. 1 is obtained with "$x$" positive, and the magnitude of the effect may be controlled by the number of eighth-wavelengths "$x$."

This system eliminates the possibility of false crossovers occurring when non-ideal components such as an unbalanced hybrid junction or crystal are utilized in the discriminator. This mode of operation makes unnecessary previously used extensive additional circuitry for a sweeping arrangement to search for the center frequency necessary for wide-band operation of automatic frequency control systems.

Many variations and modifications of the invention will occur to those who are skilled in the art to which the invention relates, and it is accordingly intended that the claims that shall follow shall not be limited, but only illustrated by the details of the various embodiments of the invention shown and described above.

What is claimed is:

A broad-band discriminator comprising a first pair of waveguides being parallel and adjacent to each other, one of said first pair of waveguides receiving an input signal, a hybrid junction interconnected with said first pair of waveguides, a second pair of waveguides being parallel and adjacent to each other and also interconnected with said hybrid junction, a cavity disposed in one of said second pair of waveguides and positioned to provide a reference plane having the characteristic of an electrical short at the center frequency of said input signal, a short at the other of said second pair of waveguides positioned one-eighth of a wavelength from said reference plane, and a detector disposed in each of said first pair of waveguides to provide an output signal from said discriminator.

References Cited in the file of this patent

UNITED STATES PATENTS 2,425,922 Crosby ---------------- Aug. 19, 1947

OTHER REFERENCES

Montgomery: Technique of Microwave Measurements, M.I.T. Radiation Laboratory Series, McGraw-Hill, 1947, pps. 63–67.

Terman: Electronc and Radio Engineering, pps. 396–398, McGraw-Hill Book Co. Inc., 1955.